United States Patent Office 2,928,750
Patented Mar. 15, 1960

2,928,750
INVESTMENT MATERIAL FOR PRECISION CASTING

Claude H. Watts, Lindhurst, Ohio, assignor to Pre-Vest, Inc.

No Drawing. Application October 5, 1959
Serial No. 844,432

4 Claims. (Cl. 106—38.3)

This invention relates to an improved bonded refractory investment material. Its use is primarily intended for the lost wax or lost pattern method of precision investment casting.

This application is a continuation-in-part of application Serial No. 627,825, filed December 12, 1956, entitled, "Investment Material for Precision Casting."

In the parent application identified above, there is a full and complete teaching of a new and novel investment material composed of graded refractory bound by the reaction products of fused magnesium oxide and an acidified sodium silicate solution. Reference is made to the specification of that application for a full disclosure of the means of practicing the invention and the superior results to be expected by following that teaching.

In the teaching of the parent application, it was disclosed that the ammonia radical could be used to modify the setting reaction. At the time the specification for the parent application was written, it was believed that the preferable means for modifying the primary binder was to neutralize a portion of the phosphoric acid of the formula with aqua ammonia. It was stated that mono ammonium phosphate was theoretically useful, but not to be preferred.

However, it has since been discovered that the use of mono ammonium phosphate makes possible a unique control of the setting reaction to offset variables of the setting reaction induced by the unique nature of commercial fused magnesium oxide. In the laboratory, where a carefully graded magnesium oxide is always available, and often with portions of a commercial shipment of the fused magnesium oxide, the grain size distribution is uniform and the use of liquid aqua ammonia is quite satisfactory. Laboratory conditions and ideal commercial products are more the exception than the rule. It has been found that, regardless of the effort made to obtain exactly uniform grain size distribution, commercial shipments of fused magnesium oxide will vary widely in the amount of fines in the product. The specification of the parent application to which this specification is appended, teaches the fact that graded fused magnesium oxide is employed for the purpose of aiding in the control of the setting time of the binder. If the proper grain size distribution is not available, then the setting time will vary unless compensated for by appropriate buffer means. It has been found that the mono ammonium phosphate is the ideal buffer in such situations and when used in this form the ammonium radical will be available to control the setting reaction.

The ammonium radical is employed to temper or slow the setting reaction. If the magnesium oxide grain distribution is exactly as specified, it is generally not necessary to employ any buffering action by the ammonium radical. Whenever the fines distribution becomes excessive, an amount of the ammonium radical is employed to temper the reaction and bring the setting time back to its desired speed. Hence, there is theoretically no lower limit to the amount of the ammonium radical which may be employed beneficially, but actual practice has indicated that the lower practical range for aqua ammonia is the three percent amount specified in the parent application, or its equivalent in the form of mono ammonium phosphate.

The value of the use of mono ammonium phosphate is that after the powder mix of the graded refractory material and the graded fused magnesium oxide has been blended properly for shipment, its characteristic with respect to the liquid phase of the binder may be checked in the laboratory. If the setting time is too fast, it then becomes a simple matter of control for the manufacturer to incorporate an appropriate amount of powdered mono ammonium phosphate into the dry materials to the extent that a properly mixed liquid phase will produce just exactly the right setting. Alternatively, the shipment may contain instructions to add particular amount of the mono ammonium phosphate to the liquid phase if the ultimate user is better equipped to handle material in this manner. The greatest advantage of this species development of the invention is in the discovery that the powder mix may be tempered at the factory before shipment in order to assure the exact settling time of the investment slurry when wetted with the standard acidified silicate solution. Thus, the control laboratories of the investment producer may be certain of the reaction of the material in production without supervising the control of the material in the consumer's operation.

Specifically, it is the object of this invention to modify an acidified sodium silicate-magnesium oxide binder by the use of the ammonium radical carried in the form of mono ammonium phosphate.

Another object of this invention is to produce an extended setting period of such a binder while retaining the desired investment characteristics.

A still further object of this invention is to cause the modification characteristic to take place as the acidified silicate is mixed with the refractory to be bound.

Other objects and a fuller understanding of the invention may be had by referring to the following description and claims.

In this specification it should be noted that the term "refractory" is not meant to include materials rapidly reactable with acid ions. Magnesium oxide is used as a refractory for high-temperature ovens, but its use in the improved investment of this invention is to react with the acidified silicate to produce a complex binder; and it is neither retained as magnesium oxide, nor considered as the refractory to be bound.

The refractory material will preferably be a blend of silica of commercial grade wherein about half is 200 mesh and the balance is divided into two parts of 30 mesh and one part 50 mesh, thus the division is approximately 50 percent of 200 mesh, 30 percent of 30 mesh, and 15 percent of 50 mesh. The commercial grades of such refractory provide a tolerance in the grade percentages and therefore these percentages are only close approximations.

The basic concept of the parent application is in the use of the reaction products of sodium silicate acidified with phosphoric acid and reacted with magnesium oxide as a binder for graded refractories.

The inclusion of the ammonia radical in the formulation can be accomplished by adding liquid ammonium hydroxide to the solution of phosphoric acid as taught in the specification of the parent application. According to this further discovery, it has been found practical to use mono ammonium phosphate by dissolving the powdered mono ammonium phosphate in the liquid binder, or preferably by adding the powdered mono ammonium phosphate to the refractory powder.

A specific example of the preferred embodiment of this alternate method as used in actual production operations is as follows:

An acid solution is prepared comprising:
  725 lbs. of 75 percent H₃PO₄ (orthphosphoric acid)
  826 lbs. of water
A sodium silicate solution is prepared comprising:
  150 lbs. of sodium silicate
  290 lbs. of water
The liquid binder is prepared using:
  3 lbs. 4 oz. of the acid solution
  5 lbs. 13 oz. of the sodium silicate solution and
  11 lbs. 2 oz. additional water An investment slurry is made up by adding to the above liquid binder, 100 lbs. of powder material comprising 93 percent graded refractory powder into which has been mixed 4 percent fused magnesium oxide and 3 percent mono ammonium phosphate.

In the following examples either 75 percent ortho phosphoric acid or 85 percent ortho phosphoric acid may be used so long as the actual amount of 100 percent ortho phosphoric acid remains the same. For example 5.15 cc. of 75 percent phosphoric acid, specific gravity 1.58 is equivalent to 4.2 cc. of 85 percent phosphoric acid, specific gravity 1.71.

For example a formula calling for 725 lbs. of 75 percent ortho phosphoric acid would only require 640 lbs. of 85 percent ortho phosphoric acid to obtain for practical purposes the equivalent amount of ortho phosphoric acid.

The following examples are given to illustrate the range of concentrations of liquid binder constituents that are useful in the practice of this invention, and also the variations that may be employed in preparation of the binders:

*Example I.—Cubic centimeter and percent equivalent of above batch example*

Liquid:
  7.85 cc. of sodium silicate—specific gravity 1.32
  5.15 cc. of 75 percent H₃PO₄—specific gravity 1.58
  87.00 cc. of water
Powder:
  4 parts by weight fused magnesium oxide
  3 parts by weight mono ammonium phosphate
  93 parts by weight graded refractory Powder and liquid mixed in the proportions of about 23 parts liquid by volume to 100 parts powder by weight.

*Example II*

Liquid:
  5 cc. of sodium silicate—specific gravity 1.32
  4 cc. of 85 percent H₃PO₄—specific gravity 1.58
  91 cc. of water
Powder:
  2 parts by weight fused magnesium oxide
  1 part by weight mono ammonium phosphate
  97 parts by weight graded refractory Powder and liquid mixed in the proportions of about 23 parts liquid by volume to 100 parts powder by weight.

*Example III*

Liquid:
  20 cc. of sodium silicate—specific gravity 1.32
  10 cc. of 85 percent H₃PO₄—specific gravity 1.58
  70 cc. of water
Powder:
  8 parts by weight fused magnesium oxide
  3 parts by weight mono ammonium phosphate
  89 parts by weight graded refractory Powder and liquid mixed in the proportions of about 23 parts liquid by volume to 100 parts powder by weight.

Calculation from the above examples will show that 23 parts of the liquid by volume of Examples I and II will contain slightly over 20 parts of water by weight added as water, exclusive of any water portion in the sodium silicate and acid. Also, from Example III, the water is about 16.0 parts by weight. Therefore, it may be said that the water added to the dry ingredients is in the range of about 15 to 20 parts by weight.

These examples are given to make clear the intent and extent of the useful material range. The experienced artisan will recognize that the concentrated silicate cannot be acidified and thereafter diluted, but rather the acidification must take place in the dilute condition.

Further, the mono ammonium phosphate will be properly used whether added to the liquid phase or the powder phase. As a practical matter it will usually be blended into the powder phase by the supply house, but such need not be the case. The result is the same in either case.

Further, the examples are set out with commonly available materials. It is the active component that takes part in the reaction, and hence one may use reagents of other specific gravity, for example, and merely adjust the ranges to provide the same absolute amounts.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A refractory investment consisting essentially of:

|  | Parts by weight |
|---|---|
| Sodium silicate—specific gravity 1.32 (6.75 sodium oxide to 25.3% silicon dioxide) | 1.45–5.8 |
| Ortho phosphoric acid, 85%—specific gravity 1.71 | 1.5–3.75 |
| Graded refractory | 89–97 |
| Mono ammonium phosphate | 1–3 |
| Fused magnesium oxide | 2–8 |

Water to make a workable slurry in a range of about 15 to 20 parts by weight, said graded refractory being substantially inert to rapid reaction with the balance of the ingredients and their reaction products.

2. The process of making refractory investment slurry comprising the steps of providing the following weight ratio of materials:

|  | Parts by weight |
|---|---|
| Sodium silicate—specific gravity 1.32 (6.75 sodium oxide to 25.3% silicon dioxide) | 1.45–5.8 |
| Ortho phosphoric acid, 85%—specific gravity 1.71 | 1.5–3.75 |
| Graded refractory | 89–97 |
| Mono ammonium phosphate | 1–3 |
| Fused magnesium oxide | 2–8 |

Water to make a workable slurry in a range of about 15–20 parts by weight, thereafter diluting together the sodium silicate and acid to provide an acidified sodium silicate solution, separately mixing the fused magnesium oxide throughout the refractory, and finally bringing together the acidified sodium silicate solution, the refractory-magnesium oxide mixture, and the mono ammonium phosphate by mixing to a pourable slurry condition, whereby the magnesium oxide and the acid ions react to form a magnesium phosphate bond and the silicate is caused to jell uniformly as an auxiliary bond in a complex green and fired strength relationship, said graded refractory being substantially inert to rapid reaction with the balance of the ingredients and their reaction products.

3. In the process of claim 2, mixing the mono ammonium phosphate with the acidified sodium silicate and thereafter bringing together the resultant solution and the refractory-magnesium oxide mixture.

4. In the process of claim 2, mixing the mono ammonium phosphate with the refractory-magnesium oxide mixture and thereafter bringing together the resultant mixture and the acidified silicate solution.

References Cited in the file of this patent

UNITED STATES PATENTS

| | | |
|---|---|---|
| 2,521,839 | Feagin | Sept. 12, 1950 |
| 2,675,322 | Watts | Apr. 13, 1954 |
| 2,680,890 | Moore et al. | June 15, 1954 |
| 2,682,092 | Henricks | June 29, 1954 |
| 2,881,081 | Henricks | Apr. 7, 1959 |